United States Patent
Massey et al.

(10) Patent No.: US 6,248,149 B1
(45) Date of Patent: Jun. 19, 2001

(54) HARDFACING COMPOSITION FOR EARTH-BORING BITS USING MACROCRYSTALLINE TUNGSTEN CARBIDE AND SPHERICAL CAST CARBIDE

(75) Inventors: Alan J. Massey, Houston; James L. Overstreet, Webster, both of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/309,323

(22) Filed: May 11, 1999

(51) Int. Cl.$^7$ .................................................. C22C 29/02
(52) U.S. Cl. .................. 75/236; 75/239; 75/240; 51/307; 175/374
(58) Field of Search ................... 75/236, 239, 240; 51/307; 175/374

(56) References Cited

U.S. PATENT DOCUMENTS

| | | | |
|---|---|---|---|
| 3,800,891 | * 4/1974 | White et al. | |
| 4,414,029 | * 11/1983 | Newman et al. | 75/252 |
| 4,944,774 | 7/1990 | Keshavan et al. | 51/309 |
| 5,492,186 | * 2/1996 | Overstreet et al. | 175/374 |
| 5,619,000 | 4/1997 | Ederyd et al. | 75/240 |
| 5,663,512 | 9/1997 | Schader et al. | 75/239 |
| 5,715,899 | 2/1998 | Liang et al. | 175/374 |
| 5,791,422 | 8/1998 | Liang et al. | 175/374 |
| 5,944,127 | 8/1999 | Liang et al. | 175/374 |
| 5,988,302 | 11/1999 | Sreshta et al. | 175/374 |

OTHER PUBLICATIONS

"A Handbook of Hard Metals"; W. Dawihl; 1955.

* cited by examiner

*Primary Examiner*—Ngoclan Mai
(74) *Attorney, Agent, or Firm*—James E. Bradley; Bracewell & Patterson, L.L.P.

(57) ABSTRACT

A hardfacing composition for an earth-boring bit has a quantity macrocrystalline tungsten carbide particles and a quantity of spherical cast tungsten carbide pellets. The particles and pellets are contained within a metal matrix which forms the balance of the composition.

7 Claims, 2 Drawing Sheets

HARDFACING COMPOSITION FOR EARTH-BORING BITS USING MACROCRYSTALLINE TUNGSTEN CARBIDE AND SPHERICAL CAST CARBIDE

TECHNICAL FIELD

This invention relates to the composition of hardfacing materials applied to surfaces subjected to abrasive wear to increase their wear resistance. More particularly, this invention relates to hardfacing compositions applied to one or more surfaces of earth-boring bits of the roller-cutter variety.

BACKGROUND OF INVENTION

It is a long-standing practice in the design and manufacture of earth-boring bits to apply wear-resistant hardfacing materials to the surfaces of such bits that are subjected to abrasive wear during drilling operations. In earth-boring bits of the rolling cutter variety, these surfaces include the teeth of bits of the milled or steel tooth variety, the gage surfaces of the rolling cutters and the shirttails of the bit legs comprising the bit body.

In the past, these hardfacing compositions generally comprise carbides of the elements of Groups IVB, VB and VIB in a matrix metal of iron, cobalt or nickel and alloys and mixtures thereof. The hardfacing is applied by melting the matrix and a portion of the surface to which the hardfacing is applied with an oxyacetylene or atomic hydrogen torch. The carbide particles give the hardfacing material hardness and wear resistance, while the matrix metal lends the hardfacing fracture toughness. A hardfacing composition must strike an adequate balance between wear resistance (hardness) and fracture toughness. A hardfacing composition that is extremely hard and wear-resistant may lack fracture toughness, causing the hardfacing to crack and flake prematurely. Conversely, a hardfacing with adequate fracture toughness, but inadequate hardness and wear resistance, is eroded prematurely and fails to serve its purpose.

Many factors affect the suitability of a hardfacing composition for a particular application. These factors include the chemical composition and physical structure of the carbides employed in the composition, the chemical composition and microstructure of the matrix metal or alloy, and the relative proportions of the carbide materials to one another and to the matrix metal or alloy.

One early advance in hardfacing compositions for use in earth-boring bits is disclosed in commonly assigned U.S. Pat. No. 3,800,891, Apr. 2, 1974 to White et al. This patent discloses a hardfacing composition comprising sintered tungsten carbide in an alloy steel matrix. Sintered tungsten carbide comprises grains or particles of tungsten carbide sintered with and held together by a binder of non-carbide material, such as cobalt. The sintered tungsten carbide possesses greater fracture toughness than the more conventional cast tungsten carbide, such that the resulting hardfacing composition possess good fracture toughness without sacrificing hardness and wear resistance.

U.S. Pat. No. 4,836,307, Jun. 6, 1989 to Keshavan et al., discloses a hardfacing composition employing particles of cemented or sintered tungsten carbide and relatively small particles of single crystal monotungsten carbide, sometimes referred to as "macrocrystalline" tungsten carbide, in a mild steel matrix. This composition purports to possess the advantages of sintered tungsten carbide, as disclosed in U.S. Pat. No. 3,800,891, with the advantages of single crystal monotungsten carbide, which is harder than the cemented or sintered tungsten carbide, yet is less brittle than the alternative cast carbide.

U.S. Pat. No. 5,089,182, Feb. 18, 1992, to Findeisen, et al. discloses a method of manufacturing cast carbide pellets that are generally spherical in shape and have improved mechanical and metallurgical properties over prior-art carbide pellets. These cast pellets are not truly spherical, but are sufficiently symmetrical that residual stresses in the pellets are minimized. Also, the generally spherical shape of these pellets eliminates corners, sharp edges and angular projections, which are present in conventional crushed particles, that increase residual stresses in the particles and tend to melt as the hardfacing composition is applied to the surface.

U.S. Pat. No. 5,663,512, Sep. 2, 1997 to Schader et al. discloses a hardfacing composition which includes a quantity of spherical sintered tungsten carbide granules and a quantity of cast spherical cast tungsten carbide granules in a eutectic form of $WC/W_2C$.

During application, some melting of the sintered spherical carbide granules occurs, which precipitates into the metal matrix and coats the spherical $WC/W_2C$ granules. This composition provides a good balance between hardness and fractures toughness.

DISCLOSURE OF INVENTION

In this invention, the hardfacing composition comprises a quantity of macrocrystalline tungsten carbide particles and a quantity of cast carbide pellets, which are generally spherical granules. The cast carbide pellets are a eutectic of $WC/W_2C$. Each of the tungsten carbide particles comprises a single crystal of monotungsten carbide WC in an irregular shape. During the application, the crystal monotungsten carbide particles melt slightly, smoothing irregular edges. The melted material partially dissolves in the matrix during cooling and the subsequent heat treating process. The melted material precipitates out into significantly smaller monotungsten carbide particles and coats on the cast eutectic carbide pellets. The metal matrix tends to adhere to this layer or coating better than to cast carbide pellets having no coating. This reduces loss of carbides during use.

The size of the macrocrystalline tungsten carbide particles may be relatively the same as the cast carbide pellets or the sizes may differ. Also, the quantity of macrocrystalline tungsten carbide particles in a preapplication ratio may be approximately the same as the cast carbide pellets by weight or they may differ. The metal matrix is conventional and from the group consisting of nickel, iron, cobalt and alloys and mixtures thereof. The relatively small irregular shaped macrocrystalline particles combined with small spherical particles allows a high density of carbide to metal matrix in the composition.

BEST MODE FOR CARRYING OUT THE INVENTION

Figure 1:
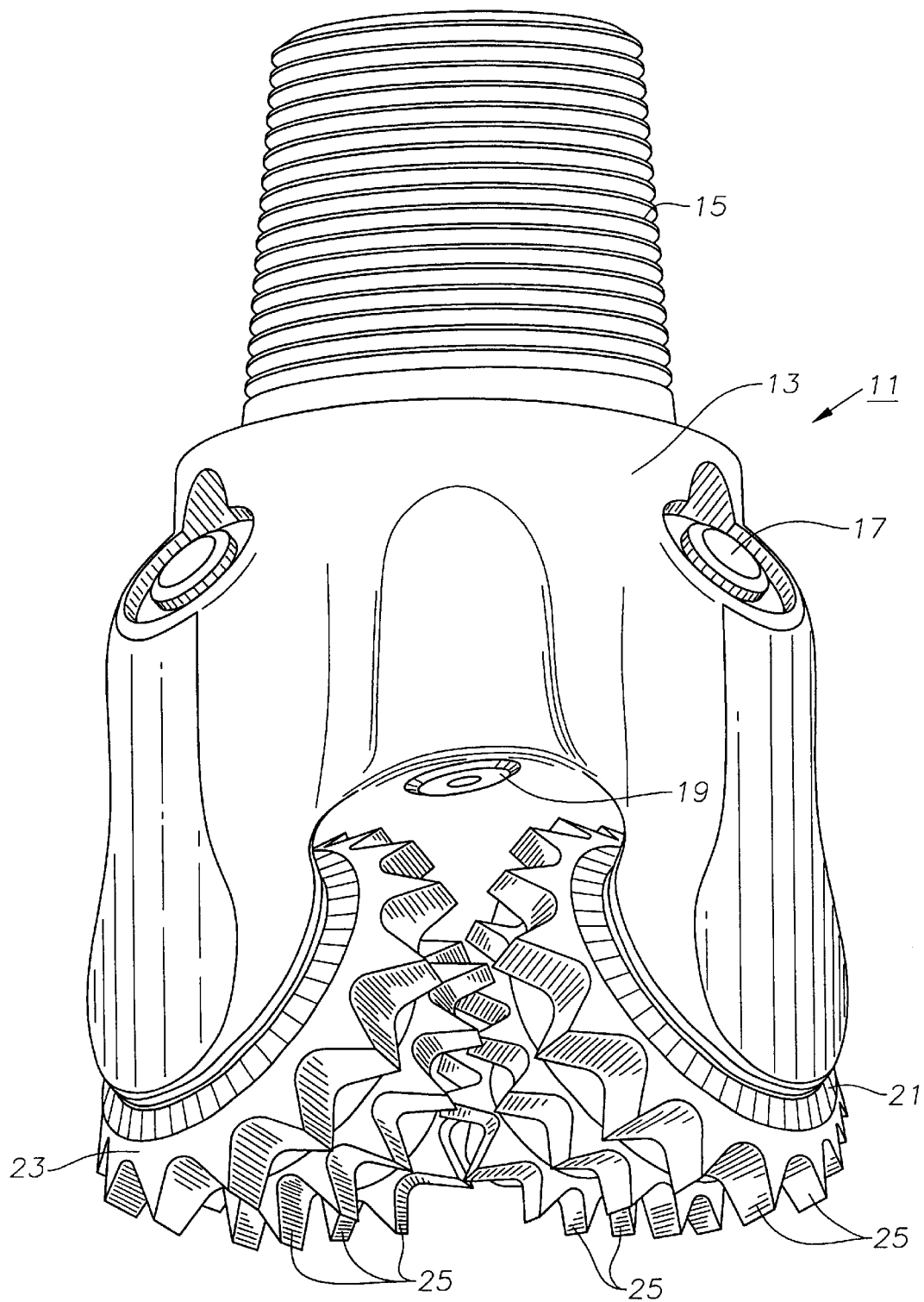
FIG. 1 is perspective view of an earth-boring bit of the type contemplated by the present invention.

Referring to FIG. 1, earth-boring bit 11 includes a bit body, which is threaded at its upper extent 15 for connection onto a drillstring. Each leg of bit body 13 is provided with a lubricant compensator 17, a preferred embodiment of which is disclosed in commonly assigned U.S. Pat. No. 4,727,942, Mar. 1, 1988 to Galle et al. At least one nozzle 19 is provided in bit body 13 to discharge drilling fluid from the interior of the drillstring to cool and lubricate bit 11 and to carry away cuttings generated during drilling. Three cutters 21, 23 (one of which is obscured from view in the perspective of FIG. 1) are rotatably mounted on cantilevered bearing shafts depending from bit body 13. A plurality of cutting elements 25 are formed on each cutter 21, 23. According to the preferred embodiment of the present invention, cutting elements 25 are milled or steel teeth formed from the material of cutters 21, 23.

Conventionally, wear-resistant hardfacing may be applied over cutting elements or teeth 25 to increase their wear-resistance. Hardfacing may also be applied to the shirttail (portion above the cutters 21, 23) of each bit leg forming the bit body 13. Hardfacing may also be applied to the outermost or gage surfaces of cutters 21, 23. These are exemplary surfaces of bit 11 that are subjected to abrasive wear during drilling operation. Hardfacing generally may be applied to any surface of bit 11 that is subjected to abrasive wear.

Figure 2:
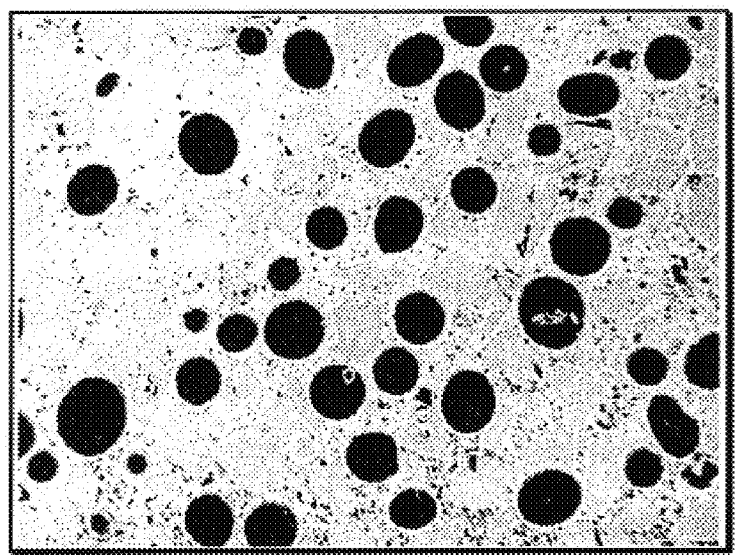
FIG. 2 is a photomicrograph of a section of hardfacing composition according to the present invention under 50 power magnification.
Figure 3:
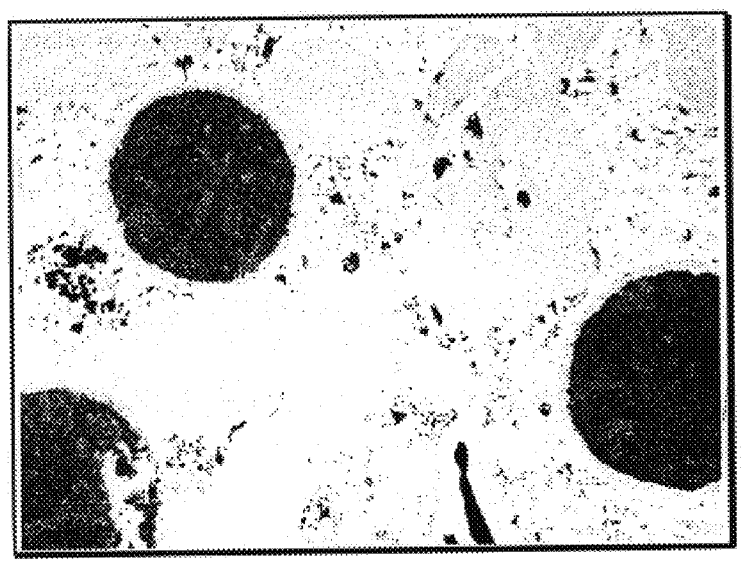
FIG. 3 is a photomicrograph of a section of the hardfacing composition according to the present invention under 200 power magnification.
Figure 4:
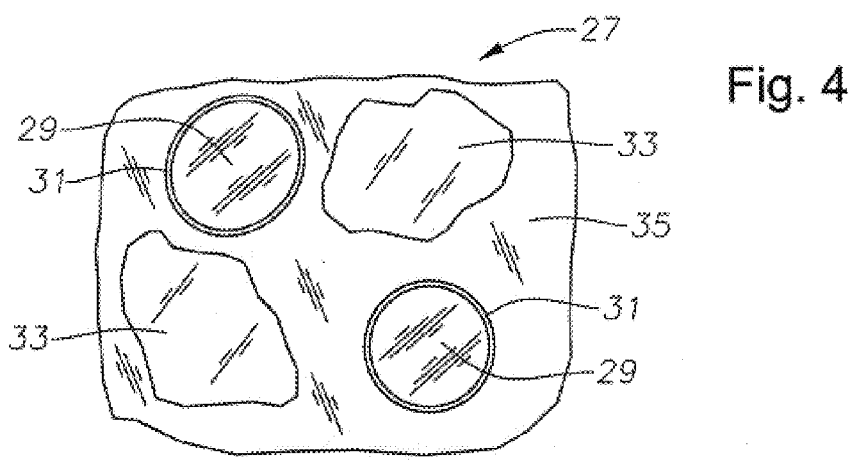
FIG. 4 is a schematic drawing of a portion of the hardfacing composition shown in the photomicrographs of FIGS. 2 and 3.

Referring to FIGS. 2–4, an improved hardfacing composition 27 that is particularly suitable for application to earth-boring bits 11 includes a quantity of spherical cast carbide pellets 29. The term "pellet" is used to mean particles of carbide that are generally spherical in configuration. Pellets 29 are not true spheres, but lack the corners, sharp edges and angular projections commonly found in crushed and other non-spherical grains or particles. Spherical cast pellets 29 are believed to have reduced levels of residual stresses and generally do not possess irregularities that are believed to melt during application. Cast pellets 29 a eutectic of WC and $W_2C$. Cast pellets 29 are the darker gray particles in the photomicrographs.

FIGS. 2–4 illustrate hardfacing composition 27 after application and heat treating. Note that cast pellets 29 have an outer layer 31 which is lighter gray in color. Outer layer 31 is a coating of WC on the WC and $W_2C$ core. Outer layer 31 does not exist in pre-application form. Rather, it occurs during application during the melting, resolidification process.

The second granules contained in composition 27 comprise macrocrystalline tungsten carbide particles 33, which are relatively small particles of single crystal monotungsten carbide. Macrocrystalline particles 33 (FIG. 4) are shown in FIGS. 2 and 3 as the lighter gray irregularly shaped particles. Macrocrystalline particles 33 have exterior irregularities which in a pre-application form are sharper and more pronounced than shown in FIGS. 2–4. During application, the sharper edges melt slightly and become more rounded. Both cast carbide pellets 29 and macrocrystalline particles 33 are preferably based on tungsten and carbon compositions. However, chromium, molybdenum, niobium, tantalum, titanium and vanadium carbides and alloys thereof, including alloys with tungsten, would also be suitable.

The balance of composition 27 is a matrix metal 35, which is preferably an iron alloy, such as low carbon steel alloyed with niobium. However, other matrix metal may be selected from the group consisting of nickel, iron, cobalt and allows and mixtures thereof. During the application process, the slight melting of macrocrystalline particles 33 causes tungsten carbide to precipitate into the molten matrix metal 35. The tungsten carbide precipitation forms layer 31 on cast pellets 29. It is believed that matrix metal 35 adheres better to WC than to the eutectic WC/$W_2C$, thus matrix metal 35 adheres better to cast pellets 29 because of layer 31 than it would if layer 31 did not exist.

Cast pellets 29 and macrocrystalline particles 33 are both commercially available. One source for macrocrystalline particles 33 is from Kennametals, Inc. Fallon, Nev. One source for cast pellets 29 is Technogenia, St. Jorioz, France. The size by weight of the macrocrystalline tungsten carbide particles 33 and the cast tungsten carbide pellets 29 may vary. In the embodiment shown the sizes are approximately the same, both being in the range of ASTM 60–80 mesh or 40–80 mesh. However, a range of 16–129 mesh for cast tungsten carbide particles 29 and 40–200 for macrocrystalline tungsten carbide particles 33 would also be suitable. Cast pellets 29 could be of a larger size or a smaller size than particles 33. The quantity by weight of the macrocrystalline tungsten carbide particles 33 and the cast tungsten carbide pellets 29 may be in the range from 50–85% by weight in a pre-application ratio of the entire composition, with the balance being matrix metal 35. The irregular shape of particles 33 combined with the spherical shape of cast pellets 29 allows a high density of carbide to metal matrix. The quantity of the macrocrystalline tungsten carbide 33 relative to the cast tungsten carbide 29 in a pre-application ratio may vary. In the photomicrographs of FIGS. 2 and 3, the quantities in a pre-application ratio by weight are the same.

In pre-application form, hardfacing composition 27 may be supplied in the form of a tube rod of matrix metal 35 containing a granular filler, the granules being macrocrystalline tungsten carbide particles 33 and cast tungsten carbide pellets 29. Also, about 2–4% by weight of silicomanganese, about 0.4–0.6% by weight niobium and about 0.36% by weight organic binder as flux, alloying element and deoxidizer and binder, respectively. In one example, the tube rod containing the granules is circular in cross-section, is formed of low-carbon steel, has an outer diameter of about ⅛ inch, a wall thickness of about 0.013 inch, and a length of about 28–30 inches.

Hardfacing composition 27 is applied by melting with a torch onto selected portions of bit 11, such as teeth 25, the gage surfaces of cutter 21, 23 and on the shirttail of each bit leg. The torch is preferably oxyacetylene. Subsequently, the hardfaced portion of bit 11 is heat treated and carburized. As mentioned above, the application process results in some melting of the macrocrystalline tungsten carbide particles 33. The tungsten carbide is precipitated into metal matrix 35 and coats cast tungsten carbide pellets 29, forming layer 31 as shown by the light gray border surrounding the dark gray cast pellets in FIG. 3. During the melting process, irregular edges of the macrocrystalline particles round to some extent.

The resulting composition has significant advantages. The spherical cast carbide is more thermally stable than macrocrystalline tungsten carbide, and therefore does not dissolve as readily into the metal matrix as the macrocrystalline tungsten carbide. The coating of WC provided by the macrocrystalline particles causes better adhesion of the spherical cast carbide in the metal matrix. The macrocrystalline tungsten carbide particles are quite wear-resistant when applied to tools that rub along the borehole wall. The spherical cast carbide is substantially harder and more wear-resistant, but more brittle than the macrocrystalline tungsten carbide, however the spherical shapes tend to reduce fracturing that would otherwise occur in irregular shaped cast particles.

Although the invention has been shown in only one of its forms, it should be apparent to those skilled in the art that it is not so limited, but is susceptible to various changes without departing from the scope of the invention. For example, the macrocrystalline particles could be eliminated, with the only granules in the applied hardfacing being the cast pellets as long as a source for coating a layer of WC onto the cast WC/W$_2$C pellets is provided during the application process.

We claim:

1. An improved, wear-resistant hardfacing composition comprising the following materials:
   a quantity of macrocrystalline carbide particles;
   a quantity of cast carbide pellets;
   a matrix metal; and
   wherein the cast carbide pellets and the macrocrystalline carbide particles range in size between about 40 mesh and 80 mesh.

2. The hardfacing composition according to claim 1, wherein the matrix metal comprises 15 to 50 percent by weight of the hardfacing composition in a pre-application ratio.

3. The hardfacing composition according to claim 1, wherein the cast carbide pellets and the macrocrystalline carbide particles are selected from one of the group of carbides consisting of chromium, molybdenum, niobium, tantalum, titanium, tungsten, and vanadium carbides and alloys and mixtures thereof.

4. The hardfacing composition according to claim 1, wherein the matrix metal is selected from the group consisting of nickel, iron, cobalt and alloys and mixtures thereof.

5. An earth-boring bit having a hardfacing on selected areas, the hardfacing comprising:
   a quantity of macrocrystalline WC particles of irregular shape;
   a quantity of WC/W$_2$C eutectic cast carbide pellets having a coating of WC;
   the balance being a matrix metal; and
   wherein the WC/W$_2$C eutectic cast carbide pellets and the macrocrystalline WC particles both range in size between about 40 mesh and 80 mesh.

6. The bit according to claim 5, wherein the matrix metal comprises 15 to 50 percent by weight of the hardfacing composition in a pre-application ratio.

7. The bit according to claim 5, wherein the matrix metal is selected from the group consisting of nickel, iron, cobalt and alloys and mixtures thereof.

* * * * *